(12) United States Patent
Makino et al.

(10) Patent No.: US 12,416,604 B2
(45) Date of Patent: Sep. 16, 2025

(54) MANAGEMENT DEVICE, MANAGEMENT METHOD, MANAGEMENT PROGRAM, AND RECORDING MEDIUM

(71) Applicant: SINTOKOGIO, LTD., Nagoya (JP)

(72) Inventors: Yoshiyasu Makino, Nagoya (JP); Kan Aoki, Nagoya (JP); Shuji Hayashida, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 690 days.

(21) Appl. No.: 17/690,305

(22) Filed: Mar. 9, 2022

(65) Prior Publication Data
US 2022/0291169 A1   Sep. 15, 2022

(30) Foreign Application Priority Data

Mar. 12, 2021 (JP) ................................ 2021-040103
Aug. 10, 2021 (JP) ................................ 2021-130731

(51) Int. Cl.
*G01N 27/90* (2021.01)
*B24C 1/10* (2006.01)

(52) U.S. Cl.
CPC ............... *G01N 27/90* (2013.01); *B24C 1/10* (2013.01)

(58) Field of Classification Search
CPC .. G01N 27/90; B24C 1/10; B24C 3/02; B24C 9/00; G06Q 10/0637; G06Q 10/04; G06Q 10/0633; G06Q 50/04
See application file for complete search history.

(56) References Cited

U.S. PATENT DOCUMENTS

| | | | | |
|---|---|---|---|---|
| 2006/0167579 A1* | 7/2006 | Fujii | ..................... | G06Q 50/04 700/109 |
| 2009/0177413 A1* | 7/2009 | Nishiyama | ............. | G01N 21/94 702/35 |
| 2013/0306871 A1* | 11/2013 | Cibere | .................... | H01L 22/12 250/340 |
| 2015/0241391 A1* | 8/2015 | Makino | ............. | G01N 27/9006 324/240 |

(Continued)

FOREIGN PATENT DOCUMENTS

| | | |
|---|---|---|
| JP | H07-016864 B2 | 3/1995 |
| JP | H10-040289 A | 2/1998 |

(Continued)

OTHER PUBLICATIONS

Notice of Reasons for Refusal issued Jan. 21, 2025 for counterpart Japanese Patent Application No. 2021-130731.

(Continued)

*Primary Examiner* — Ziaul Karim
(74) *Attorney, Agent, or Firm* — Faegre Drinker Biddle & Reath LLP

(57) ABSTRACT

A management device includes: an acquisition unit that acquires inspection result data indicating an inspection result of each of a plurality of workpieces and processing condition data indicating a processing condition used for processing each of the plurality of workpieces; an analysis unit that selects a specific parameter correlated with the inspection result among a plurality of processing parameters; and a prediction unit that predicts predict whether or not the processing device will become abnormal in future based on a temporal change in a value of the specific parameter.

20 Claims, 14 Drawing Sheets

(56) References Cited

U.S. PATENT DOCUMENTS

| | | | | |
|---|---|---|---|---|
| 2017/0326867 A1* | 11/2017 | Hartke | ............... | B29C 64/153 |
| 2018/0343385 A1* | 11/2018 | Mimura | ............... | H04N 23/65 |
| 2019/0295845 A1* | 9/2019 | Clark | ............... | H01L 22/20 |
| 2020/0083080 A1* | 3/2020 | Clark | ............... | H01L 21/76834 |
| 2021/0157312 A1* | 5/2021 | Cella | ............... | G01M 13/045 |

FOREIGN PATENT DOCUMENTS

| | | |
|---|---|---|
| JP | H1-181186 A | 3/1999 |
| JP | 2002-024204 A | 1/2002 |
| JP | 2015-525336 A | 9/2015 |
| JP | 2018-200548 A | 12/2018 |
| WO | WO-2014/192335 A1 | 12/2014 |

OTHER PUBLICATIONS

Japanese Office Action issued Jun. 17, 2025 in Application No. 2021-130731.

* cited by examiner

MANAGEMENT DEVICE, MANAGEMENT METHOD, MANAGEMENT PROGRAM, AND RECORDING MEDIUM

CROSS-REFERENCE TO RELATED APPLICATION

This application is based on Japanese Patent Application No. 2021-040103 filed with Japan Patent Office on Mar. 12, 2021 and Japanese Patent Application No. 2021430731 filed with Japan Patent Office on. Aug. 10, 2021 and claims the benefit of priority thereto. The entire contents of these applications are incorporated herein by reference.

TECHNICAL FIELD

The present disclosure relates to a management device, a management method, a management program, and a recording medium.

BACKGROUND

Processing such as heat treatment, plating treatment, welding, and shot peening may be performed. For example, in the shot peening processing, the quality is controlled by performing stress measurement and magnetic evaluation on a product selected from the processed products (see, for example, Japanese Unexamined Patent Application Publication No. 2015-525336).

SUMMARY

Each part of the processing equipment (processing device) may deteriorate over time. Deterioration of the processing device may affect the quality of the product. Therefore, in the technical field, it is desired to predict a future abnormality of a processing device.

The present disclosure describes a management device, a management method, a management program, and a recording medium capable of predicting a future abnormality of a processing device.

A management device according to one aspect of the present disclosure is a device that manages a processing device. The processing device is a device that sequentially processes a plurality of workpieces under a processing condition including a plurality of processing parameters. The management device includes an acquisition unit, an analysis unit, and a prediction unit. The acquisition unit acquires inspection result data and processing condition data. The inspection result data indicates an inspection result of each of the plurality of workpieces. The processing condition data indicates a processing condition used for processing each of the plurality of workpieces. The analysis unit selects a specific parameter. The specific parameter is a processing parameter correlated with the inspection result among the plurality of processing parameters. The prediction unit predicts whether or not the processing device will become abnormal in future based on a temporal change in a value of the specific parameter.

A management method according to another aspect of the present disclosure is a method of managing a processing device. The processing device is a device that sequentially processes a plurality of workpieces under a processing condition including a plurality of processing parameters. The management method includes a step of acquiring inspection result data and processing condition data, a step of selecting a specific parameter, and a step of predicting whether or not the processing device will become abnormal in future based on a temporal change in a value of the specific parameter. The inspection result data indicates an inspection result of each of the plurality of workpieces. The processing condition data indicates a processing condition used for processing each of the plurality of workpieces. The specific parameter is a processing parameter correlated with the inspection result among the plurality of processing parameters.

A management program according to still another aspect of the present disclosure is a program that causes a computer to operate so as to manage a processing device. The processing device is a device that sequentially processes a plurality of workpieces under a processing condition including a plurality of processing parameters. The management program is a program for causing a computer to execute a step of acquiring inspection result data and processing condition data, a step of selecting a specific parameter, and a step of predicting whether or not the processing device will become abnormal in future based on a temporal change in a value of the specific parameter. The inspection result data indicates an inspection result of each of the plurality of workpieces. The processing condition data indicates a processing condition used for processing each of the plurality of workpieces. The specific parameter is a processing parameter correlated with the inspection result among the plurality of processing parameters.

A recording medium according to still another aspect of the present disclosure is a computer-readable recording medium in which a management program is recorded. The management program is a program that causes a computer to operate so as to manage a processing device. The processing device is a device that sequentially processes a plurality of workpieces under a processing condition including a plurality of processing parameters. The management program is a program for causing a computer to execute a step of acquiring inspection result data and processing condition data, a step of selecting a specific parameter, and a step of predicting whether or not the processing device will become abnormal in future based on a temporal change in a value of the specific parameter. The inspection result data indicates an inspection result of each of the plurality of workpieces. The processing condition data indicates a processing condition used for processing each of the plurality of workpieces. The specific parameter is a processing parameter correlated with the inspection result among the plurality of processing parameters.

In the management device, the management method, the management program, and the recording medium, a specific parameter correlated with an inspection result is selected from among a plurality of processing parameters. Whether or not the processing device will become abnormal in future is predicted based on a temporal change in a value of the selected specific parameter. When the value of a processing parameter that may affect the inspection result among the plurality of processing parameters changes over time, it is considered that the processing accuracy of the workpiece decreases. Therefore, it is possible to predict the deterioration of the processing device, that is, the future abnormality of the processing device by considering the temporal change in the value of the specific parameter correlated with the inspection result.

In some embodiments, the prediction unit may predict that the processing device will become abnormal in future when the value of the specific parameter indicates an increasing tendency or a decreasing tendency. If a portion of the processing device associated with a processing parameter is deteriorated, the value of the processing parameter is considered to indicate an increasing tendency or a decreasing tendency. In a case where the value of the specific parameter correlated with the inspection result indicates an increasing tendency or a decreasing tendency, it is considered that the processing accuracy of the workpiece decreases. Therefore, the above configuration makes it possible to improve the prediction accuracy of the future abnormality of the processing device.

In some embodiments, the processing device may include components respectively associated with the plurality of processing parameters. The prediction unit may predict whether or not a component associated with the specific parameter will become abnormal in future. In this case, a component that will become abnormal in future can be specified in the processing device. Therefore, it is possible to perform maintenance such as replacement of the component before the component becomes abnormal.

In some embodiments, the prediction unit may predict a time when the inspection result indicates an abnormality based on a temporal change in the inspection result. Until the inspection result indicates abnormality, the workpiece can be processed normally. Therefore, by predicting the time when the inspection result indicates abnormality, the processing device can be repaired before the time comes.

In some embodiments, the management device may further include a determination unit. The determination unit may determine whether or not a sudden abnormality has occurred in the processing device based on the inspection result. The processing device may not only deteriorate over time, but also suddenly become abnormal. The above configuration makes it possible to detect not only a future abnormality but also a sudden abnormality of the processing device. Therefore, it is possible to more appropriately manage the processing device.

In some embodiments, the determination unit may set a normal range based on an inspection result of a workpiece processed normally, and may determine that the sudden abnormality has occurred when the inspection result indicated by the inspection result data is out of the normal range. If the inspection result is out of the normal range, there is a possibility that some abnormalities have occurred in the processing device. Therefore, the above configuration makes it possible to appropriately detect a sudden abnormality of the processing device.

In some embodiments, the management device may further include an output unit. The output unit may output a prediction result by the prediction unit. In this case, the administrator of the processing device can recognize the prediction result. Therefore, it is possible to repair the processing device before an abnormality occurs in the processing device. As a result, the processing accuracy of the workpiece can be maintained.

According to aspects and embodiments of the present disclosure, it is possible to predict a future abnormality of a processing device.

DETAILED DESCRIPTION

In the following, some embodiments of the present disclosure will be described with reference to the drawings. It should be noted that in the description of the drawings, the same components are designated with the same reference signs, and the redundant description is omitted.

Figure 1:
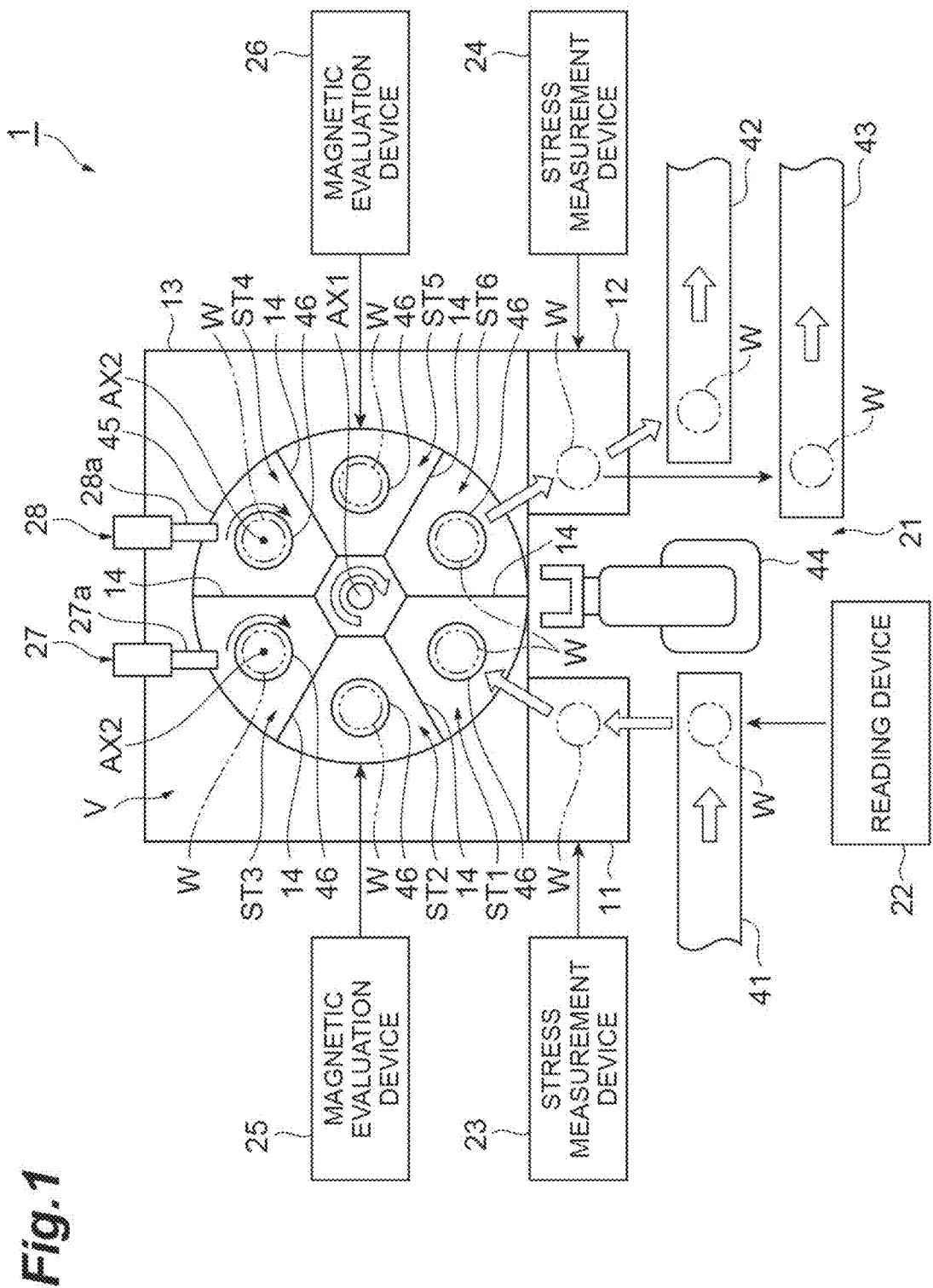
FIG. 1 is a configuration diagram schematically showing a processing device according to an embodiment.
Figure 2:
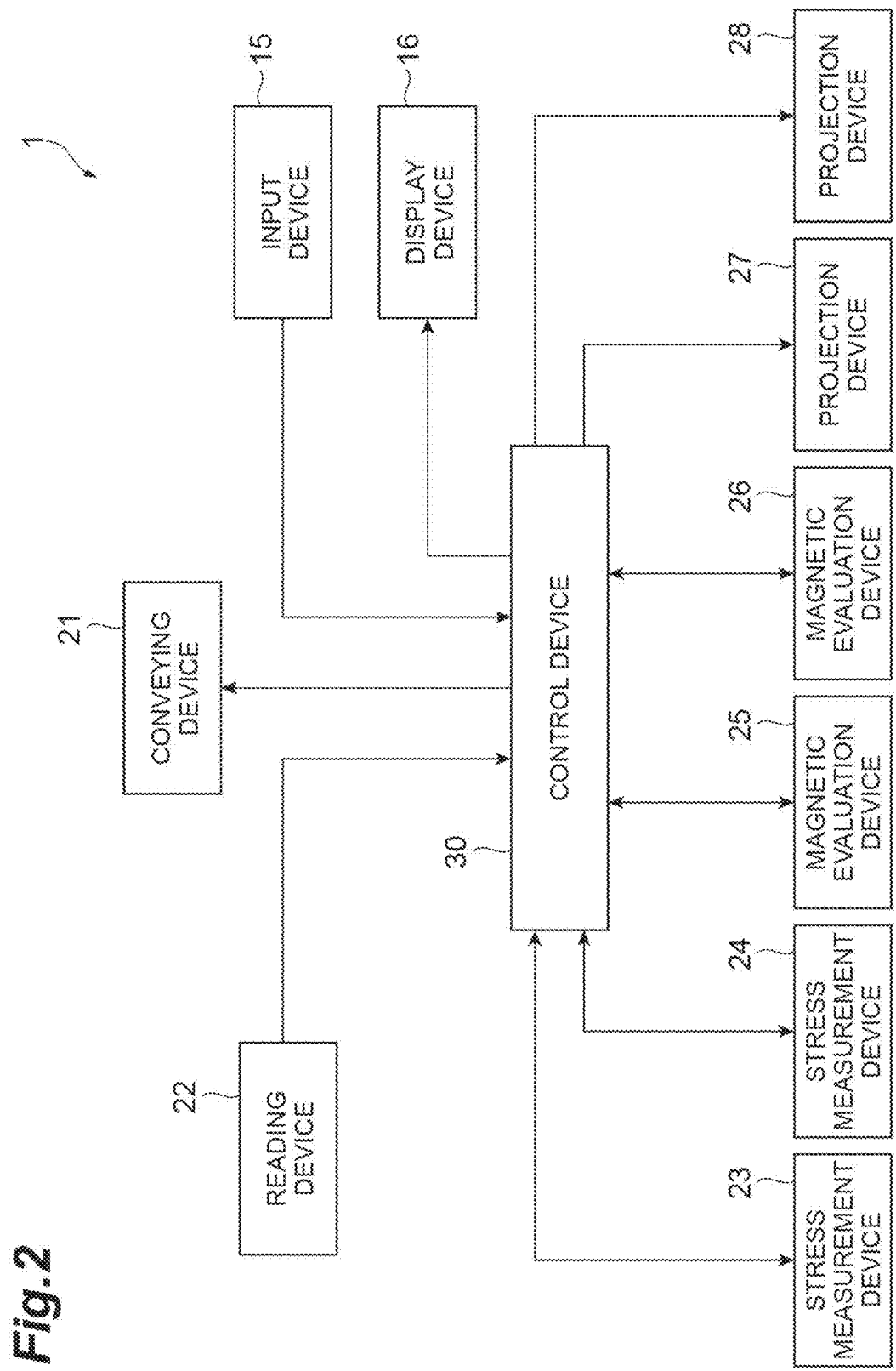
FIG. 2 is a block diagram of the processing device shown in FIG. 1.

A processing device according to an embodiment will be described with reference to FIGS. 1 and 2. FIG. 1 is a configuration diagram schematically showing a processing device according to an embodiment. FIG. 2 is a block diagram of the processing device shown in FIG. 1. A processing device 1 shown in FIGS. 1 and 2 is a device that sequentially processes a plurality of workpieces W under the predetermined processing condition, Examples of the workpiece W include gear steel and spring steel. Examples of the gear steel include chrome molybdenum steel (JIS SCM420H), chrome steel (SCr420H), and nickel chrome steel (JIS SNCM439). An example of the springing steel is a manganese-chromium steel (JIS SUP9). In the present embodiment, a shot peening device will be described as an example of the processing device 1. The processing condition includes a plurality of processing parameters. Each processing parameter can be directly or indirectly measured by a sensor or the like provided in the processing device 1. Examples of the processing parameters include pressure, projection volume, and processing time.

The processing device 1 includes an inspection table 11, an inspection table 12, and a cabinet 13. The inspection table 11 is a table on which an unprocessed workpiece W is placed. The inspection table 11 is provided outside the cabinet 13 and is positioned in front of a carry-in port of the cabinet 13. Stress measurement is performed on the workpiece W placed on the inspection table 11. The inspection table 12 is a table on which the processed workpiece W is placed. The inspection table 12 is provided outside the cabinet 13 and is positioned in front of a carry-out port of the cabinet 13. Stress measurement is performed on the workpiece W placed on the inspection table 12.

The cabinet 13 has a box-like shape that defines an internal space V. A plurality of chambers are provided in the internal space V of the cabinet 13. The plurality of chambers include a carry-in chamber ST1, an inspection chamber ST2, a projection chamber ST3, a projection chamber ST4, an inspection chamber ST5, and a carry-out chamber ST6. The carry-in chamber ST1, the inspection chamber ST2, the projection chamber ST3, the projection chamber ST4, the inspection chamber ST5, and the carry-out chamber ST6 are arranged in this order around a rotational axis AX1 of a rotary table 45 described later, Two chambers adjacent to each other are partitioned by a partition part 14 having a wall plate shape. Each chamber may be referred to as a station.

The carry-in chamber ST1 is a chamber for carrying the workpiece W into the cabinet 13, The inspection chamber ST2 is a chamber for inspecting electromagnetic characteristics of the workpiece W on which the shot peening has not yet been performed. Each of the projection chambers ST3 and ST4 is a chamber for performing shot peening. The inspection chamber ST5 is a chamber for inspecting the electromagnetic characteristics of the workpiece W on which the shot peening has been performed. The carry-out chamber ST6 is a chamber for carrying out the workpiece W from the cabinet 13.

The processing device 1 includes an input device 15, a display device 16, a conveying device 21, a reading device 22, a stress measurement device 23, a stress measurement device 24, a magnetic evaluation device 25, a magnetic evaluation device 26, a projection device 27, a projection device 28, and a control device 30.

The input device 15 is a device for operating the control device 30. Examples of the input device 15 include a touch panel, a mouse, and a keyboard. The display device 16 is a device for displaying various types of information. An example of the display device 16 is a display.

The conveying device 21 is a device that conveys the workpiece W The conveying device 21 includes conveyors 41 to 43, a robot 44, a rotary table 45, and a plurality of (six in the present embodiment) placement tables 46.

The conveyor 41 is a conveyor for carrying in the workpiece W, The conveyor 41 extends from the preceding process to the vicinity of the inspection table 11, and conveys the workpiece W from the preceding process. The conveyor 42 is a conveyor for carrying out the workpiece W. The conveyor 42 extends from the vicinity of the inspection table 12 to the post-process, and conveys the workpiece W to the post-process. The conveyor 43 is a conveyor for discarding the workpiece W. The conveyor 43 extends, for example, from the vicinity of the inspection table 12 to an inspection device (not illustrated) for performing destructive inspection, and conveys the workpiece W to the inspection device.

The robot 44 is a robot for carrying the workpiece W. The robot 44 is, for example, a six-axis robot. The robot 44 moves the workpiece \V from the conveyor 41 to the inspection table 11. The robot 44 moves the stress-inspected workpiece W from the inspection table 11 to the carry-in chamber ST1 in the cabinet 13. The robot 44 moves the workpiece W from the carry-out chamber ST6 to the inspection table 12. The robot 44 moves the stress-inspected workpiece W from the inspection table 12 to the conveyor 42 or the conveyor 43.

The rotary table 45 is a disk-shaped table for conveying the workpiece W in the order of the carry-in chamber ST1, the inspection chamber ST2, the projection chamber ST3, the projection chamber ST4, the inspection chamber ST5, and the carry-out chamber ST6. The rotary table 45 is disposed in the cabinet 13. The rotary table 45 is provided over the carry-in chamber ST1, the inspection chamber ST2, the projection chamber ST3, the projection chamber ST4, the inspection chamber ST5, and the carry-out chamber ST6. The rotary table 45 is provided so as to be rotatable around a rotational axis AX1 passing through the center of the rotary table 45. The rotary table 45 intermittently rotates around the rotational axis AX1 so that the placement table 46 located in one chamber stops at a predetermined position in the adjacent chamber. The rotational axis AX1 is surrounded by the carry-in chamber ST1, the inspection chamber ST2, the projection chamber ST3, the projection chamber ST4, the inspection chamber ST5, and the carry-out chamber ST6.

The placement table 46 is a disk-shaped table on which the workpiece W is placed. The plurality of placement tables 46 are provided on the upper surface of the rotary table 45, and are circularly arranged at regular intervals in the circumferential direction of the rotary table 45. The diameter of each placement table 46 is smaller than the diameter of the rotary table 45. Each placement table 46 is provided so as to be rotatable around a rotational axis AX2 passing through the center of the placement table 46. The direction in which each of the rotational axes AX2 extends is substantially the same as the direction in which the rotational axis AX1 extends. As the rotary table 45 rotates, the placement tables 46 circulate through the stations in the order of the carry-in chamber ST1 the inspection chamber ST2, the projection chamber ST3, the projection chamber ST4, the inspection chamber ST5, and the carry-out chamber ST6. The partition portion 14 is provided with an opening through which the placement table 46 can pass.

The reading device 22 is a device that acquires workpiece information related to the workpiece W. The workpiece information includes, for example, a workpiece ID and a type of the workpiece W. The workpiece ID is information by which the workpiece W can be uniquely identified. In the present embodiment, the reading device 22 is a device (reader) that reads workpiece information held in a tag attached to the workpiece W. Examples of the tag include a radio frequency identification (RFID) tag, a QR code (registered trademark), and a barcode. The reading device 22 is provided, for example, on the side of the downstream end of the conveyor 41. The reading device 22 outputs the workpiece information to the control device 30.

Each of the stress measurement devices 23 and 24 is a device that measures residual stress on the surface of the workpiece W The stress measurement device 23 measures residual stress on the surface of the workpiece W placed on the inspection table 11. The stress measurement device 24 measures residual stress on the surface of the workpiece W placed on the inspection table 12. Each of the stress measurement devices 23 and 24 performs residual stress measurement using, for example, an X-ray stress measurement method. In the X-ray stress measurement method, strain of a crystal is measured from a change in crystal lattice spacing of a material such as a metal by X-ray diffraction, and a stress value is calculated. An example of the X-ray stress measurement method is a cos a method. Since the X-ray stress measurement method such as the cos a method is known, a detailed description thereof will be omitted here. Each of the stress measurement devices 23 and 24 outputs the measured residual stress value to the control device 30.

Each of the magnetic evaluation devices 25 and 26 is a device that measures the electromagnetic characteristics of the workpiece W The magnetic evaluation device 25 measures the electromagnetic characteristics of the workpiece W stopped in the inspection chamber ST2. The magnetic evaluation device 26 measures the electromagnetic characteristics of the workpiece W stopped in the inspection chamber ST5. In the case where the workpiece W is a conductor, the permeability and conductivity of the conductor change due to a change in systematic strain such as internal elasticity and plasticity caused by surface processing or phase transformation caused by processing. Each of the magnetic evaluation devices 25 and 26 evaluates the presence or absence of a spot on the workpiece W and the state of the metal structure using, for example, an eddy current method. The eddy current is a current generated in a conductor by a magnetic field that changes aver time. The eddy current has a feature of changing the depth of penetration into the workpiece W depending on the frequency of the magnetic field (excitation frequency). Therefore, not only the inside of the workpiece W can be inspected, but also the tendency of the surface processing can be evaluated more specifically by setting the excitation frequency in accordance with the depth from the surface of the workpiece W.

Each of the magnetic evaluation devices 25 and 26 includes a cylindrical core and a coil wound around an outer peripheral surface of the core. The workpiece: W is disposed in the internal space defined by the core so that the surface of the inspection target of the workpiece W faces the inner peripheral surface of the core. In this state, an alternating magnetic field is generated by supplying alternating current power of a predetermined frequency to the coil. As a result, an eddy current flowing in a direction intersecting the alternating magnetic field is excited on the surface of the inspection target. A frequency sweep eddy current method may be used. The frequency sweep eddy current method is a method in which the excitation frequency is swept in a wide range so that eddy currents gradually penetrate the inside of the workpiece W up to about 200 µm from the outermost surface, and an eddy current reaction at each excitation frequency is measured. Each of the magnetic evaluation devices 25 and 26 outputs the measured value to the control device 30 together with the excitation frequency.

From the measured value by the magnetic evaluation device 25 and the measured value by the magnetic evaluation device 26 at the same excitation frequency, the ratio of the impedance of the coil with respect to the unprocessed workpiece W and the impedance of the coil with respect to the processed workpiece W (hereinafter referred to as "eddy current ratio") is obtained. The eddy current ratio is calculated in the control device 30, for example.

Each of the projection devices 27 and 28 is a device that projects shot media to the workpiece \\ and is, for example, an air nozzle type shot peening machine. Each of the projection devices 27 and 28 projects compressed air containing shot media from a nozzle and causes the shot media to collide with the workpiece W. The nozzle 27a of the projection device 27 is provided on a side wall of the projection chamber ST3. The projection port of the nozzle 27a is set to face the workpiece W stopped in the projection chamber ST3. The nozzle 28a of the projection device 28 is provided on a side wall of the projection chamber ST4. The projection port of the nozzle 28a is set to face the workpiece W stopped in the projection chamber ST4.

The control device 30 is a device (controller) that integrally controls the processing device 1 and manages the processing device 1. The control device 30 is configured as, for example, a computer including a processor such as a central processing unit (CPU), memories such as a random access memory (RAM) and a read only memory (ROM), and a communication device such as a network card.

Figure 3:
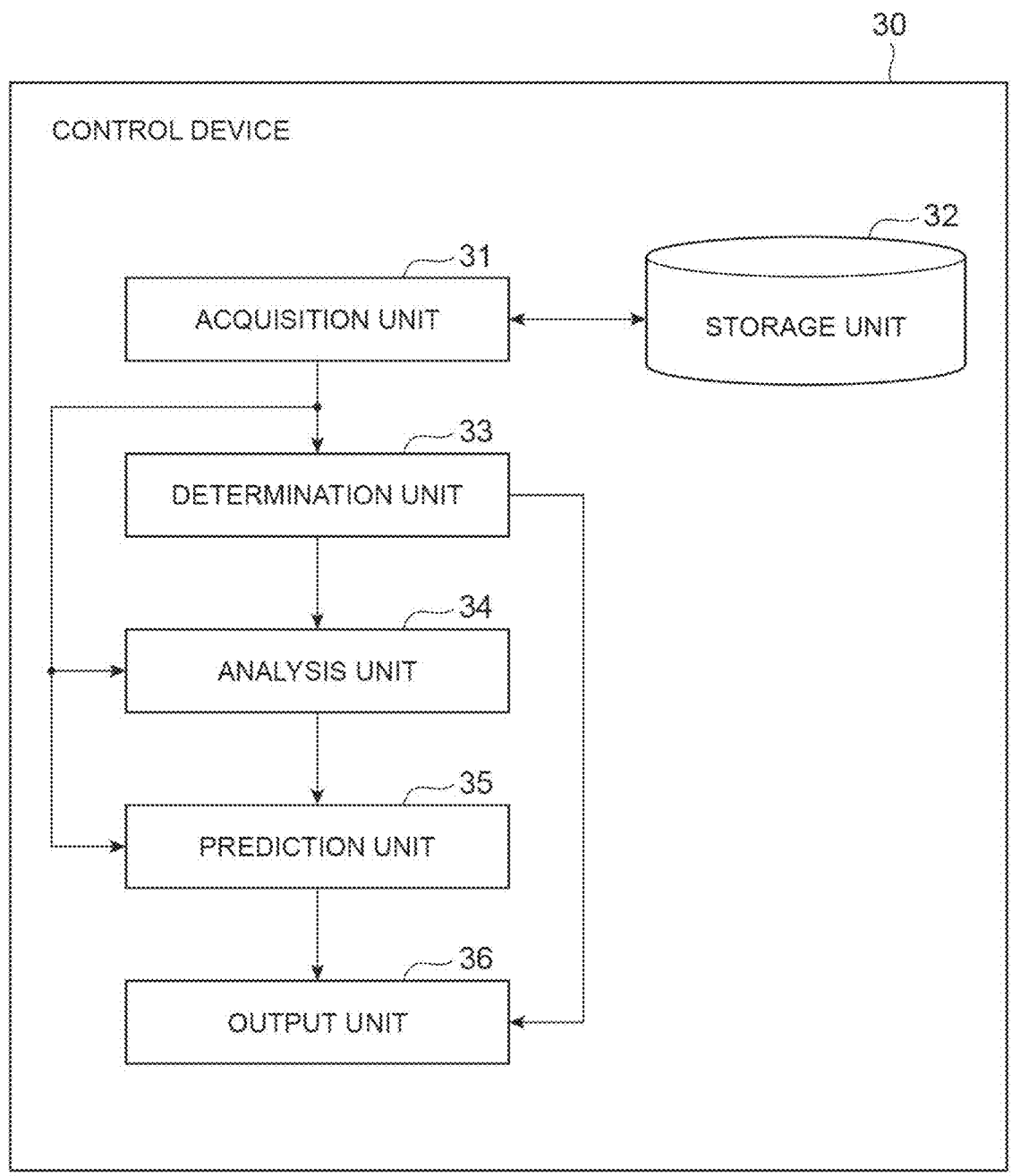
FIG. 3 is a block diagram showing a functional configuration of the control device shown in FIG. 2.

Next, a functional configuration of the control device 30 will be described with reference to FIG. 3, FIG. 3 is a block diagram showing a functional configuration of the control device shown in FIG. 2. As shown in FIG. 3, the control device 30 functionally includes an acquisition unit 31, a storage unit 32, a determination unit 33, an analysis unit 34, a prediction unit 35, and an output unit 36. In the following description of the management method, the function (operation) of each functional unit will be described in detail, and thus the function of each functional unit will be briefly described here.

The acquisition unit 31 is a functional unit that acquires various types of information. The acquisition unit 31 acquires, for example; the workpiece information of each of the plurality of workpieces W, the processing condition data of each of the plurality of workpieces W, and the inspection result data of each of the plurality of workpieces W. Specifically, the acquisition unit 31 acquires workpiece information, processing time, processing condition data, and inspection result data for each workpiece W, and outputs inspection data in which these data are associated with each other to the storage unit 32. The processing time is, for example, a time at which the reading device 22 reads the workpiece information from the workpiece W identified by the workpiece ID, The processing condition data is data indicating a processing condition used for processing the workpiece W identified by the workpiece ID. Specifically, the processing condition data indicates a value of each processing parameter. The inspection result data is data indicating an inspection result of the workpiece W identified by the workpiece ID. In the present embodiment, the inspection results include a residual stress value of the unprocessed workpiece W, a residual stress value of the processed workpiece W and an eddy current ratio.

In response to the control device 30 receiving the analysis command, the acquisition unit 31 acquires inspection data for a predetermined period from the storage unit 32. The acquisition unit 31 acquires, for example, inspection data for one day, one week, one month, or one year.

The storage unit 32 is a functional unit that stores the inspection data received from the acquisition unit 31. The storage unit 32 stores inspection data for each workpiece W.

The determination unit 33 is a functional unit that determines whether or not a sudden abnormality has occurred in the processing device 1 based on the inspection result. The determination unit 33 sets a normal range based on an inspection result of a normally processed workpiece (non-defective sample), and determines that a sudden abnormality has occurred when the inspection result acquired by the acquisition unit 31 is out of the normal range. When the inspection result is out of the normal range, the determination unit 33 may determine that a sudden abnormality has occurred in the processing device 1 or noise has been mixed in. In the following description, when the inspection result is out of the not mal range, the determination unit 33 determines that a sudden abnormality has occurred in the processing device 1.

The analysis unit 34 is a functional unit that analyzes inspection data. The analysis unit 34 selects a specific parameter from a plurality of processing parameters. The specific parameter is a processing parameter correlated with the inspection result. The analysis unit 34 calculates a correlation coefficient between the inspection result and each processing parameter, and selects the processing parameter having the correlation coefficient as the specific parameter when the absolute value of the correlation coefficient is larger than a correlation threshold value. The correlation coefficient has a value in a range of −1 to +1. The closer the correlation coefficient is to −1, the stronger the negative correlation between the inspection result and the processing parameter is. The closer the correlation coefficient is to +1, the stronger the positive correlation between the inspection result and the processing parameter is. The correlation threshold value is a value indicating that the inspection result and the processing parameter have a strong correlation, and is set to, for example, 0.7.

The prediction unit 35 is a functional unit that predicts a future abnormality of the processing device 1 based on a temporal change in the value of the specific parameter. In other words, the prediction unit 35 predicts whether or not the processing device 1 will become abnormal in the future. When the value of the specific parameter indicates an increasing tendency or a decreasing tendency, the prediction unit 35 predicts that the processing device 1 will become abnormal in the future. The prediction unit 35 predicts, for example, a future abnormality of a component related to the specific parameter. The prediction unit 35 may predict the time when the inspection result will indicate an abnormality based on the temporal change in the inspection result.

The output unit 36 is a functional unit that outputs various types of information. The output unit 36 outputs, for example, the determination result by the determination unit 33 and the prediction result by the prediction unit 35.

Figure 4:
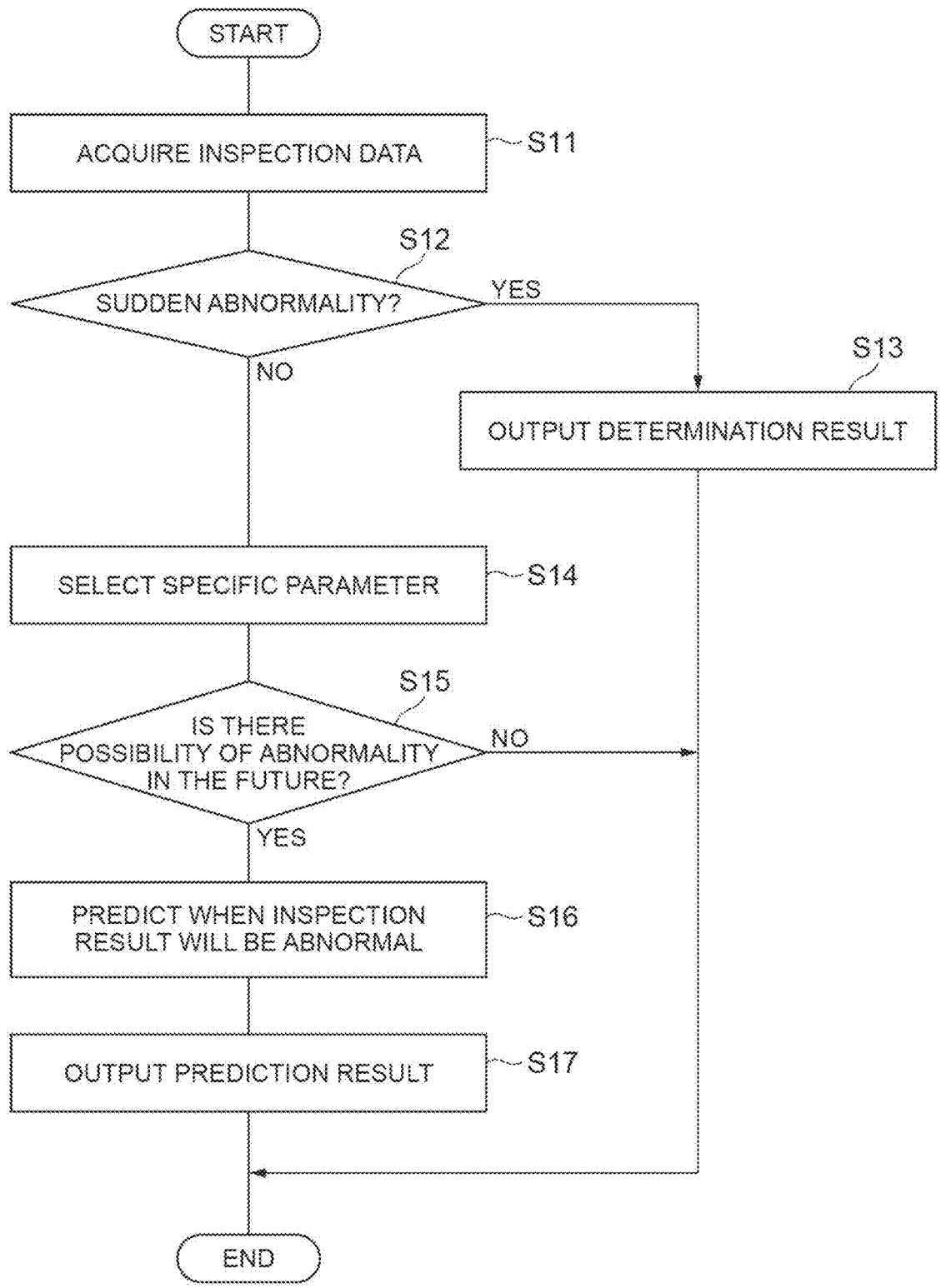
FIG. 4 is a flowchart showing a management method performed by the control device shown in FIG. 2.
Figure 5:
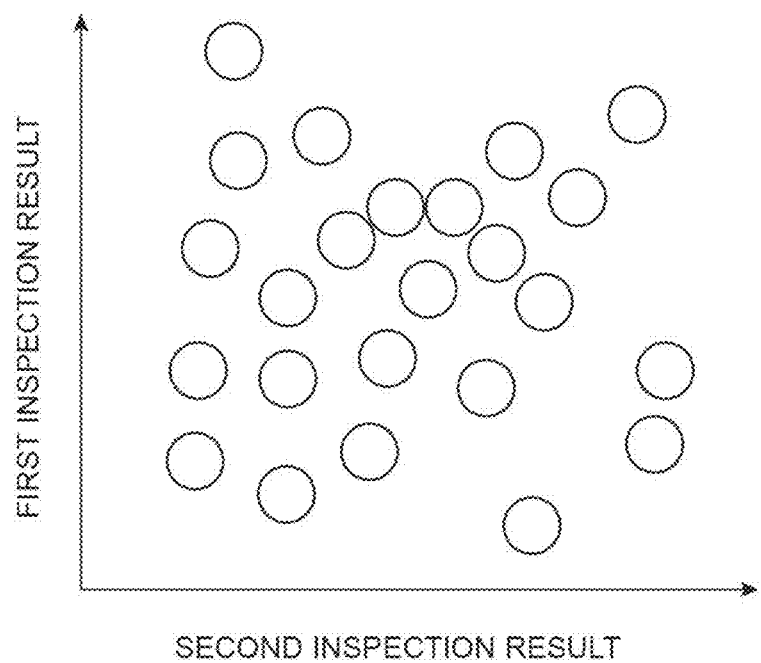
FIG. 5 is a diagram for describing mapping of inspection results.
Figure 6:
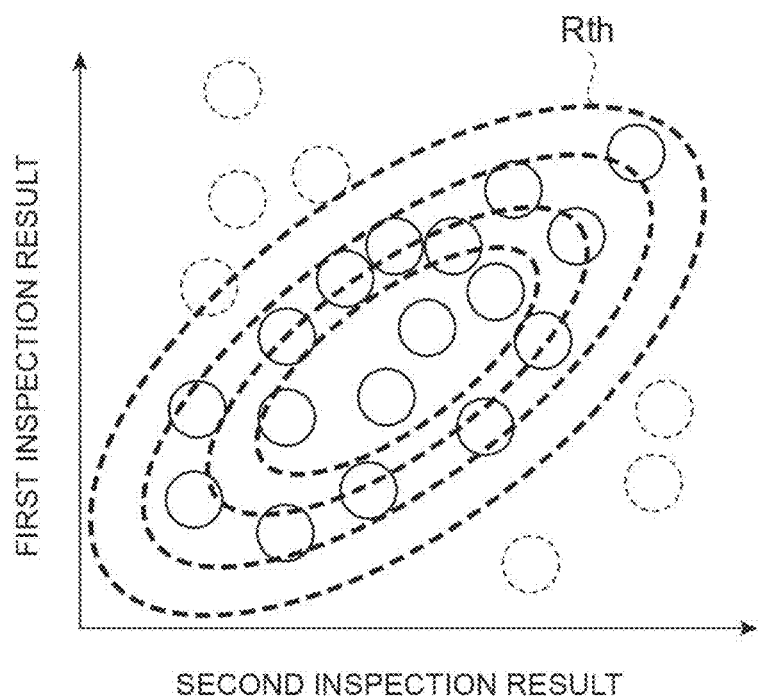
FIG. 6 is a diagram for describing a threshold circle.
Figure 7:
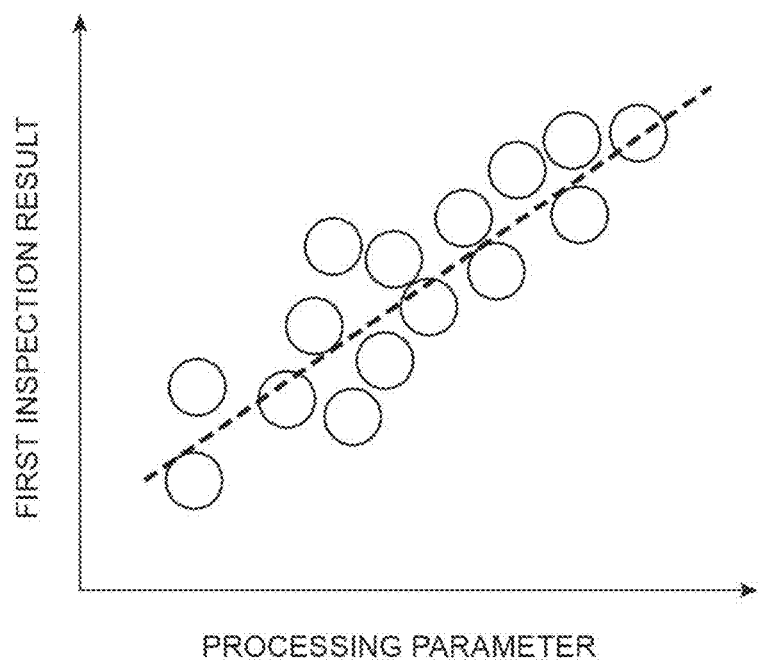
FIG. 7 is a diagram for describing a method of calculating a correlation coefficient.
Figure 8:
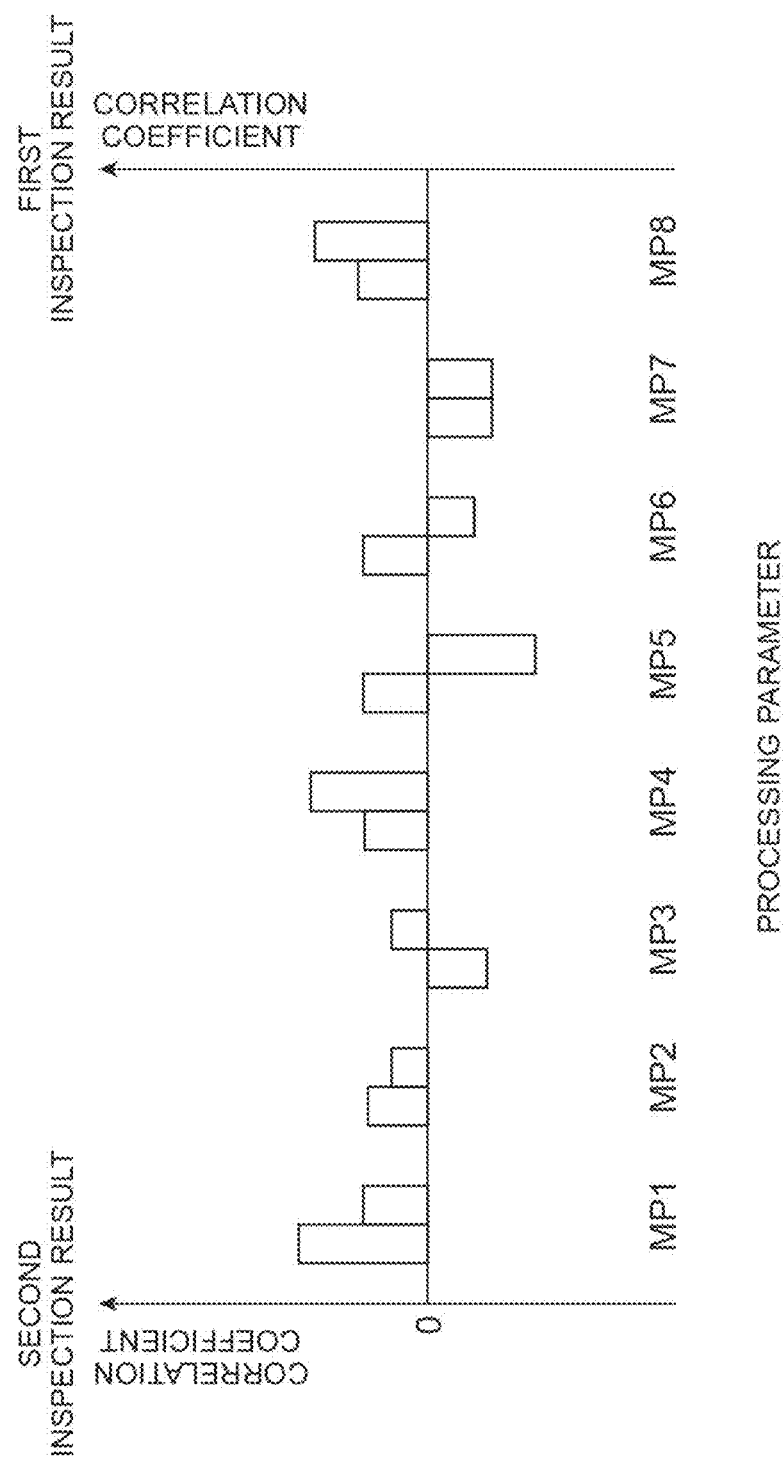
FIG. 8 is a diagram showing an example of a correlation coefficient between an inspection result and each processing parameter.
Figure 9:
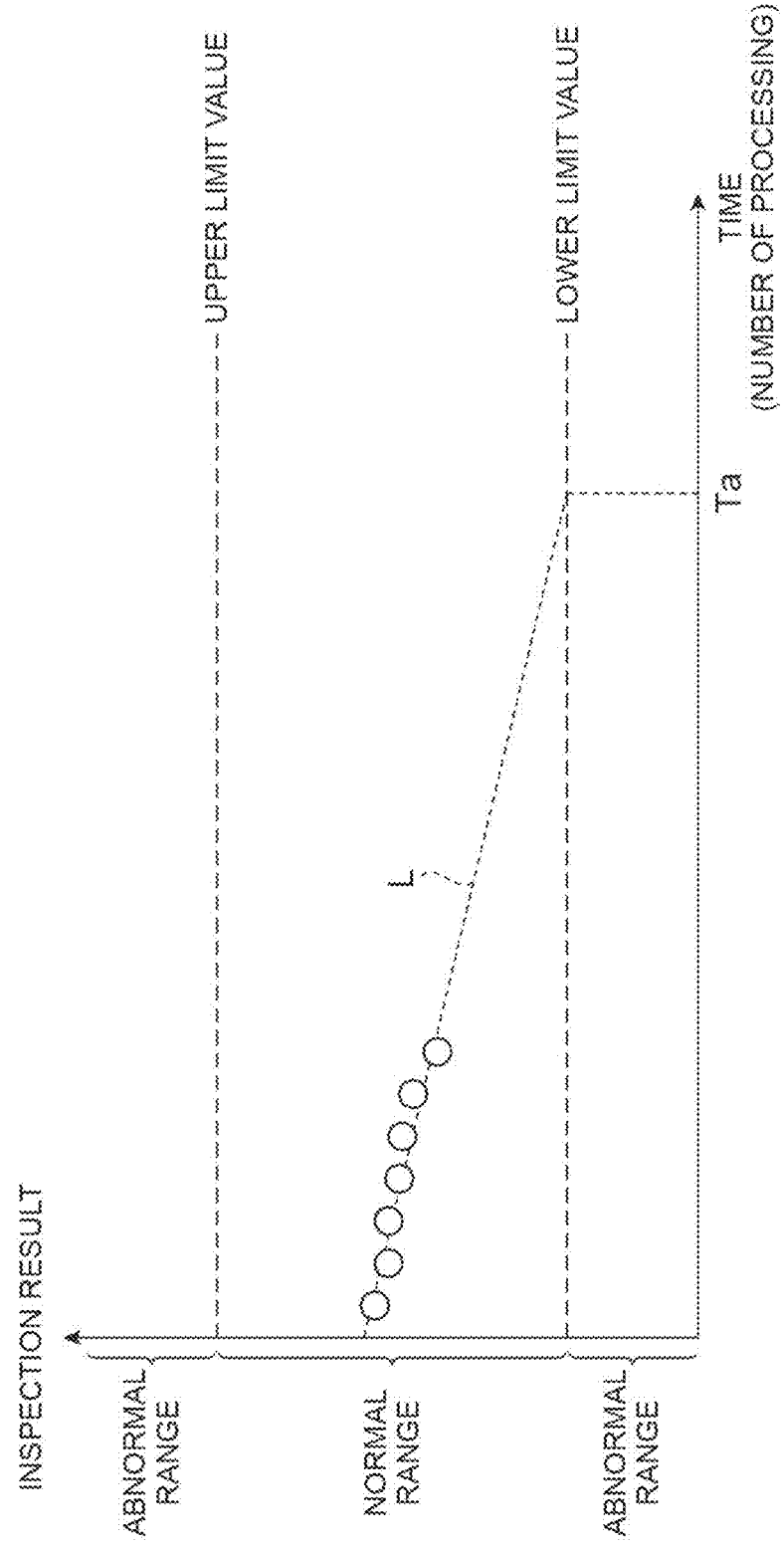
FIG. 9 is a diagram for describing a method of predicting a time when an inspection result indicates an abnormality.

Next, a management method performed by the control device 30 will be described with reference to FIGS. 4 to 9. FIG. 4 is a flowchart showing a management method performed by the control device shown in FIG. 2. FIG. 5 is a diagram for describing mapping of inspection results. FIG. 6 is a diagram for describing a threshold circle. FIG. 7 is a diagram for describing a method of calculating a correlation coefficient. FIG. 8 is a diagram showing an example of a correlation coefficient between an inspection result and each processing parameter. FIG. 9 is a diagram for describing a method of predicting a time when an inspection result indicates an abnormality. The series of processes shown in FIG. 4 is started, for example, in response to the control device 30 receiving an analysis command from the input device 15. The processing device 1 has already processed a sufficient number of workpieces W, and a sufficient number of pieces of inspection data are stored in the storage unit 32.

First, the acquisition unit 31 acquires inspection data (step S11). In step S11, the acquisition unit 31 acquires inspection data for a predetermined period including the latest inspection data among the inspection data stored in the storage unit 32. Then, the acquisition unit 31 outputs the inspection data to the determination unit 33 and the analysis unit 34.

Subsequently, the determination unit 33 determines whether or not a sudden abnormality has occurred (step S12). In step S12, upon receiving the inspection data from the acquisition unit 31, the determination unit 33 determines whether a sudden abnormality has occurred by comparing each inspection result included in each inspection data with the normal range. The normal range is set in advance.

To be more specific, as shown in FIG. 5, for example, the determination unit 33 maps a point indicating the first inspection result and the second inspection result obtained from each non-defective sample in a coordinate space in which the vertical axis is set to the first inspection result and the horizontal axis is set to the second inspection result. For example, the first inspection result is an inspection result related to stress measurement, and the second inspection result is an inspection result related to magnetic evaluation. Examples of the inspection result related to stress measurement include a residual stress value and a full width at half maximum of the processed workpiece W. An example of the inspection result related to the magnetic evaluation is an eddy current ratio. Then, as shown in FIG. 6, the determination unit 33 sets the threshold circle Rth by modeling the mapped points through multivariate analysis. The MT method may be used for multivariate analysis. In this case, the threshold circle Rth is set based on the Mahalanobis distance.

The determination unit 33 maps points indicating the first inspection result and the second inspection result of each inspection data in the coordinate space, and determines whether each point is included in the threshold circle Rth or outside the threshold circle Rth. When any point is located outside the threshold circle Rth, the determination unit 33 calculates the distance between the point and the circumference of the threshold circle Rth. When the distance is larger than the determination threshold value, the determination unit 33 determines that a sudden abnormality has occurred. When all the points are located inside the threshold circle Rth, the determination unit 33 determines that any sudden abnormality has not occurred, Even when some points are located outside the threshold circle Rth, the determination unit 33 determines that any sudden abnormality has not occurred when the distances between every point located outside the threshold circle Rth and the threshold circle Rth is smaller than the determination threshold value.

In step S12, when it is determined that a sudden abnormality has occurred (step S12: YES), the determination unit 33 outputs the determination result to the output unit 36. Then, the output unit 36 outputs the determination result (step S13). The output unit 36 outputs the determination result to, for example, the display device 16 (display). As shown in FIG. 6, upon receiving the determination result from the output unit 36, the display device 16 may display a threshold circle and a point indicating that the sudden abnormality has occurred in a graph. Thus, a series of processes of the management method is completed.

On the other hand, in step S12, when it is determined that any sudden abnormality has not occurred (step S12: NO), the analysis unit 34 selects a specific parameter having a correlation with the inspection result from among the plurality of processing parameters (step S14). In step S14, the analysis unit 34 first calculates a correlation coefficient between the inspection result and each processing parameter using the inspection data received from the acquisition unit 31. For example, the analysis unit 34 calculates a correlation coefficient between the first inspection result (residual-stress value) and each of the processing parameters such as projection pressure, projection volume, and processing time.

As shown in FIG. 7, for example, the analysis unit 34 maps a point indicating the first inspection result and the value of the processing parameter when the first inspection result is obtained in a coordinate space in which the vertical axis is set to the first inspection result and the horizontal axis is set to one processing parameter. Then, the analysis unit 34 calculates a correlation coefficient between the first inspection result and the processing parameter by a known method. Similarly, for the remaining processing parameters, the analysis unit 34 calculates a correlation coefficient with the first inspection result. Similarly, the analysis unit 34 calculates a correlation coefficient between the second inspection result and each of the processing parameters.

As shown in FIG. 8, when the correlation coefficient between each inspection result and each processing parameter (processing parameters MP1 to MP8) is obtained, the analysis unit 34 compares the absolute values of the correlation coefficients with the correlation threshold value. Then, when the absolute value of the correlation coefficient is larger than the correlation threshold value, the analysis unit 34 selects the processing parameter having the correlation coefficient as the specific parameter. Then, the analysis unit 34 outputs information indicating the specific parameter to the prediction unit 35. The analysis unit 34 may select two or more specific parameters.

Subsequently, the prediction unit 35 determines whether or not there is a possibility that the processing device 1 will become abnormal in the future (whether or not the possibility is high) (step S15). In step S15, the prediction unit 35 predicts a future abnormality of the processing device 1 based on the temporal change in the value of the specific parameter selected by the analysis unit 34. Specifically, the prediction unit 35 determines whether the value of the specific parameter indicates an increasing tendency or a decreasing tendency, or neither an increasing tendency nor a decreasing tendency. To be more specific, for example, the prediction unit 35 approximates the specific parameter by a linear formula of time by performing a single regression analysis on the time-series data of the value of the specific parameter. When the absolute value of the gradient of the approximate straight line is larger than a predetermined gradient, the prediction unit 35 determines that the value of the specific, parameter indicates an increasing tendency or a decreasing tendency.

Then, when the value of the specific parameter indicates an increasing tendency or a decreasing tendency, the prediction unit 35 predicts that there is a (high) possibility that the processing device 1 will become abnormal in the future. When the value of the specific parameter indicates neither an increasing tendency nor a decreasing tendency, the prediction unit 35 predicts that there is no (low) possibility that the processing device 1 will become abnormal in the future. When the value of the specific parameter indicates an increasing tendency or a decreasing tendency, it is considered that the component related to the specific parameter is deteriorated. For example, if the specific parameter is pressure, it is considered that components (a compressor, an air flow control valve, and the like) for supplying compressed air are deteriorated. Therefore, the prediction unit 35 may predict that the component related to the specific parameter will become abnormal in the future.

In step S15, when it is determined that there is no (low) possibility that the processing device 1 will become abnormal in the future (step S15: NO), a series of processes of the management method is completed. On the other hand, in step S15, when it is determined that there is a (high) possibility that the processing device 1 will become abnormal in the future (step S15: YES), the prediction unit 35 predicts a time when the inspection result will become abnormal (step S16).

In step S16, the prediction unit 35 first estimates the inspection result that will become abnormal by using the specific parameter indicating an increasing tendency or a decreasing tendency. The prediction unit 35 estimates the inspection result that will become abnormal from among the first inspection result and the second inspection result by, for example, a single regression analysis. The prediction unit 35 may estimate an inspection result having a larger correlation coefficient with the specific parameter among the first inspection result and the second inspection result as the inspection result that will become abnormal. Then, the prediction unit 35 predicts a time at which the inspection result will indicate an abnormality based on the temporal change in the estimated inspection result. For example, the prediction unit 35 predicts a time when the inspection result will indicate an abnormality by performing a single regression analysis on the time-series data of the inspection result.

Specifically, as shown in FIG. 9, the prediction unit 35 approximates the inspection result by a linear formula of time by performing a single regression analysis on the time-series data of the inspection result. Then, the prediction unit 35 calculates a time (timing) at which the straight line L representing the linear formula exceeds the upper limit value of the normal range or falls below the lower limit value of the normal range as a timing at which the inspection result will indicate an abnormality. In the example shown in FIG. 9, the straight line L falls below the lower limit value at the time Ta. Then, the prediction unit 35 outputs the prediction result to the output unit 36. The prediction result includes, for example, the specific parameter indicating an increasing tendency or a decreasing tendency, the inspection result that will become abnormal due to the specific parameter, and a time when the inspection result indicates an abnormality.

Subsequently, the output unit 36 outputs the prediction result (step S17). The output unit 36 outputs the prediction result to, for example, the display device 16 (display). Then, the display device 16 displays the prediction result. For example, as shown in FIG. 9, the display device 16 may graphically display the time-series data of the inspection result and the time Ta at which the inspection result indicates an abnormality. Thus, a series of processes of the management method is completed.

After step S13, the processes of step S14 and subsequent steps may be performed. In this case, the processes of step S14 and subsequent steps are performed using the inspection data other than the inspection data indicating the sudden abnormality.

Figure 10:
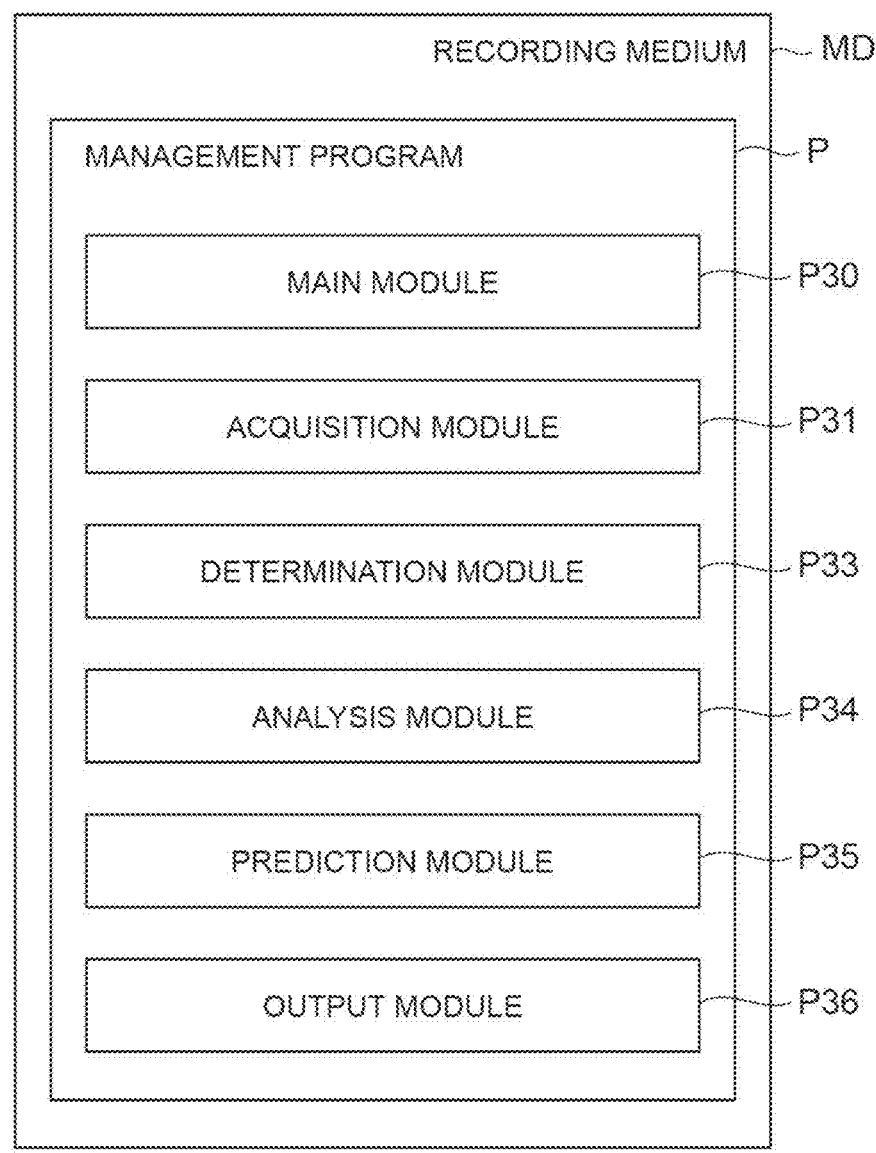
FIG. 10 is a diagram showing a configuration of a management program recorded in a recording medium.

Next, a management program P for causing a computer to function as the control device 30 (management device) and a recording medium MD on which the management program P is recorded will be described with reference to FIG. 10, FIG. 10 is a diagram showing the configuration of the management program recorded on the recording medium.

As shown in FIG. 10, the management program P includes a main module P30, an acquisition module P31, a determination module P33, an analysis module P34, a prediction module P35, and an output module P36. The main module P30 is a section that integrally controls processes related to the control device 30. The functions realized by executing the acquisition module P31, the determination module P33, the analysis module P34, the prediction module P35, and the output module P36 are the same as the functions of the acquisition unit 31, the determination unit 33, the analysis unit 34, the prediction unit 35, and the output unit 36 in the above-described embodiment, respectively.

The management program P is provided by a computer-readable recording medium MD such as a compact disc read only memory (CD-ROM), a digital versatile disc read only memory (DVD-ROM), and a semiconductor memory. The management program P may be provided as data signals via a communication network.

In the control device 30, the management method, the management program P, and the recording medium MD described above, a specific parameter correlated with the inspection result is selected from among the plurality of processing parameters, and whether or not the processing device 1 will become abnormal in the future is predicted based on a temporal change in the value of the specific parameter. It is considered that the values of the processing parameters change over time due to deterioration of the processing device 1 over time. If the value of a processing parameter that may affect the inspection result among the plurality of processing parameters changes over time, it is considered that the processing accuracy of the workpiece W decreases. Therefore, it is possible to predict the deterioration of the processing device 1, that is, the future abnormality of the processing device 1 by considering the temporal change in the value of the specific parameter correlated with the inspection result.

In a case where a portion (component) of the processing device 1 related to a processing parameter is deteriorated, it is considered that the value of the processing parameter indicates an increasing tendency or a decreasing tendency. Among the processing parameters, in a case where the value of the specific parameter correlated with the inspection result indicates an increasing tendency or a decreasing tendency, it is considered that the processing accuracy of the workpiece W decreases. Therefore, when the value of the specific parameter indicates an increasing tendency or a decreasing tendency, the prediction unit 35 predicts that the processing device 1 will become abnormal in the future. Therefore, it is possible to improve the prediction accuracy of the future abnormality of the processing device 1.

The processing device 1 has components respectively associated with the processing parameters. The prediction unit 35 predicts that the component related to the specific parameter will become abnormal in the future. According to this configuration, a component that will become abnormal in the future can be specified in the processing device 1. Therefore, it is possible to perform maintenance such as replacement of the component at an appropriate timing before the component becomes abnormal. As a result, it is possible to maintain the processing accuracy of the workpiece W, and it is possible to suppress the occurrence of defective products. By predicting when parts should be replaced, the number of parts for replacement can be reduced.

The prediction unit 35 predicts a time when the inspection result will indicate an abnormality based on the temporal change in the inspection result. Until the inspection result indicates an abnormality, the workpiece W can be processed normally. Therefore, by predicting the time when the inspection result will indicate an abnormality, the processing device 1 can be repaired before the time comes.

The processing device 1 may not only deteriorate over time, but also suddenly become abnormal, Given these facts, the determination unit 33 determines whether or not a sudden abnormality has occurred in the processing device 1 based on the inspection result. This configuration makes it possible to detect not only a future abnormality of the processing device 1 but also a sudden abnormality. Therefore, it is possible to more appropriately manage the processing device 1.

If the inspection result is out of the normal range of the inspection result, there is a possibility that some abnormalities have occurred in the processing device 1. Therefore, the determination unit 33 determines that a sudden abnormality has occurred when the inspection result is out of the normal range set based on the inspection result of the workpiece W that has been processed normally. This configuration makes it possible to appropriately detect a sudden abnormality of the processing device 1.

The output unit 36 outputs the prediction result by the prediction unit 35. According to this configuration, the administrator of the processing device 1 can recognize the prediction result. Therefore, it is possible to repair the processing device 1 before an abnormality occurs in the processing device 1. As a result, it is possible to maintain the processing accuracy of the workpiece W. Since the abnormality of the processing device 1 can be prevented in advance, the number of administrators who administer the processing device 1 can be reduced.

The analysis unit 34 selects, as the specific parameter, a processing parameter for which the absolute value of the correlation coefficient between the inspection result and the processing parameter is larger than the correlation threshold value. Therefore, even if the administrator of the processing device 1 is not familiar with the processing device 1, this configuration makes it possible to estimate a processing parameter that affects processing accuracy (quality of the workpiece W).

The management device, the management method, the management program, and the recording medium according to the present disclosure are not limited to the above-described embodiments.

The processing device 1 is not limited to a shot peening device. The processing device 1 may be a heat treatment device, a casting device, or a processing device such as a polishing device or a grinding device.

In the above-described embodiment, the control device 30 has the function of the management device of the processing device 1 (the functional unit shown in FIG. 3). However, a server device provided outside the processing device 1 may have the function of the management device. In this case, the Internet of Things (IoT) technology is utilized in the processing device 1 such as the shot peening device, and this makes it possible to achieve the next-generation "manufacturing" using the surface evaluation technology.

The acquisition unit 31 may further acquire process data indicating a physical quantity in the process. Examples of such physical quantities include vibration, sound, and surface temperature. These physical quantities can be measured by sensors provided in the processing device 1. By analyzing the process data, it is possible to detect an abnormality of the processing device 1 in the process.

Figure 11:
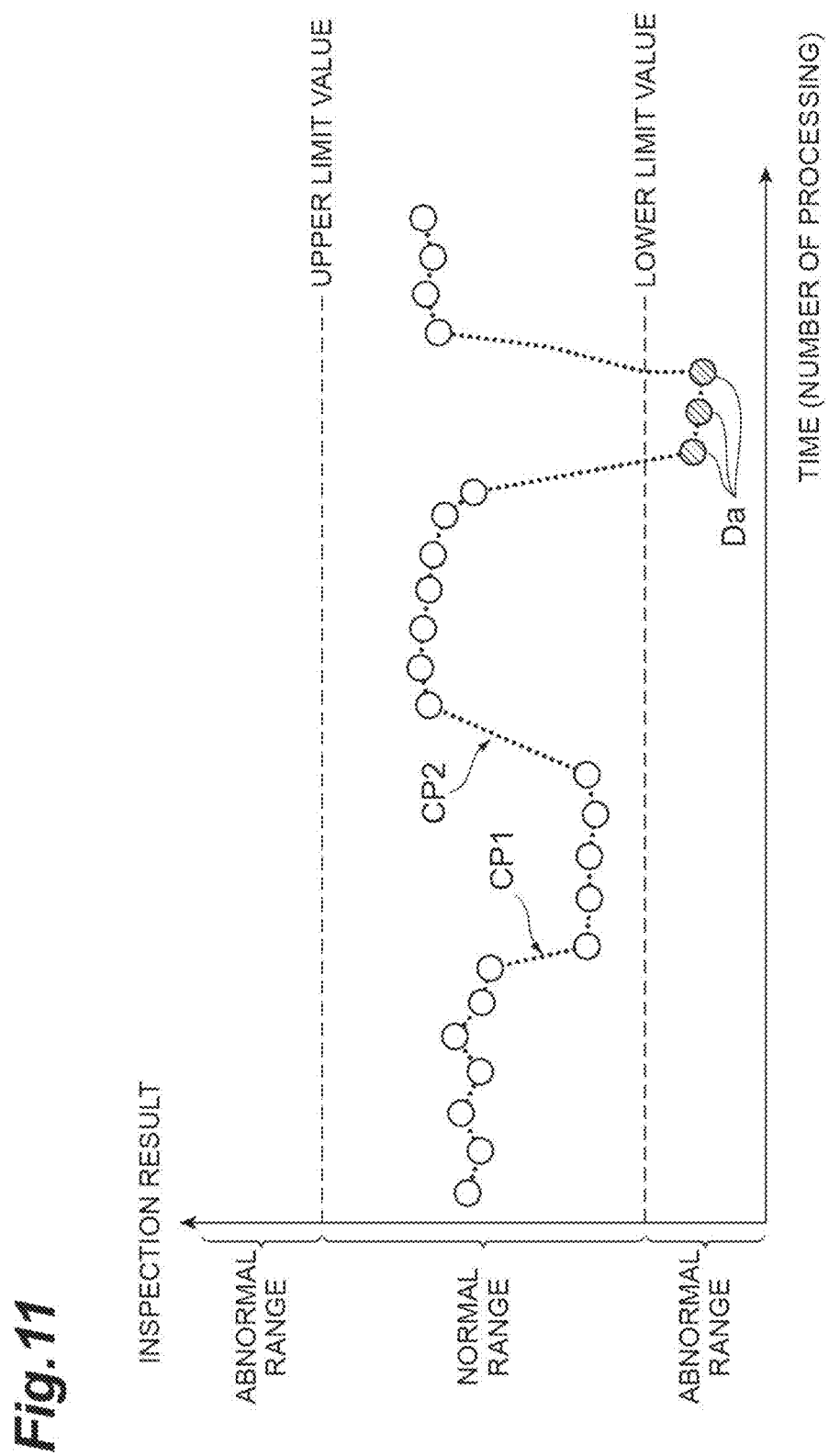
FIG. 11 is a diagram showing a display example of an inspection result.

The output unit 36 may cause the display device 16 to display the inspection data of the plurality of workpieces W. For example, as shown in FIG. 5, the display device 16 may map and display points indicating the first inspection result and the second inspection result in the coordinate space. As shown in FIG. 11, the display device 16 may display the inspection results in chronological order for each inspection result. In the display example shown in FIG. 11, the upper limit value and the lower limit value of the normal range are displayed, and the inspection results are displayed in time series. The inspection result Da determined as the sudden abnormality is displayed in a display mode different from that of the normal inspection result. Further, changing points CP1 and CP2 are displayed. The changing point CP1 is a changing point due to switching of the material lot. The changing point CP2 is a changing point due to replacement of a component of the processing device 1. The causes of the changing points CP1 and CP2 may be input from the input device 15 by the administrator of the processing device 1 and may be displayed together with the inspection result.

According to this configuration, the administrator of the processing device 1 can check the change point of the inspection result related to the quality of the workpiece W in time series. Even if the administrator does not have experience and intuition in using the processing device 1, the normal range can be easily set. Since the normal range is set from statistical inspection results in which the processing variation is taken into consideration instead of an ambiguous reference such as the intuition of the administrator, it is possible to improve the determination accuracy of a sudden abnormality.

The analysis unit 34 may output an analysis result to the output unit 36. The analysis result includes a graph in which points indicating each inspection result and the value of the processing parameter when the inspection result is obtained are mapped, and a correlation coefficient between each inspection result and each processing parameter. The output unit 36 may output the analysis result to the display device 16, and the display device 16 may display the analysis result. The display device 16 displays graphs as shown in FIGS. 7 and 8, for example.

The analysis unit 34 may perform another analysis by using the inspection data of the plurality of workpieces W. The analysis unit 34 outputs each analysis result to the output unit 36, and the output unit 36 causes the display device 16 to display each analysis result. Some examples of other analyses are described below.

Figure 12:
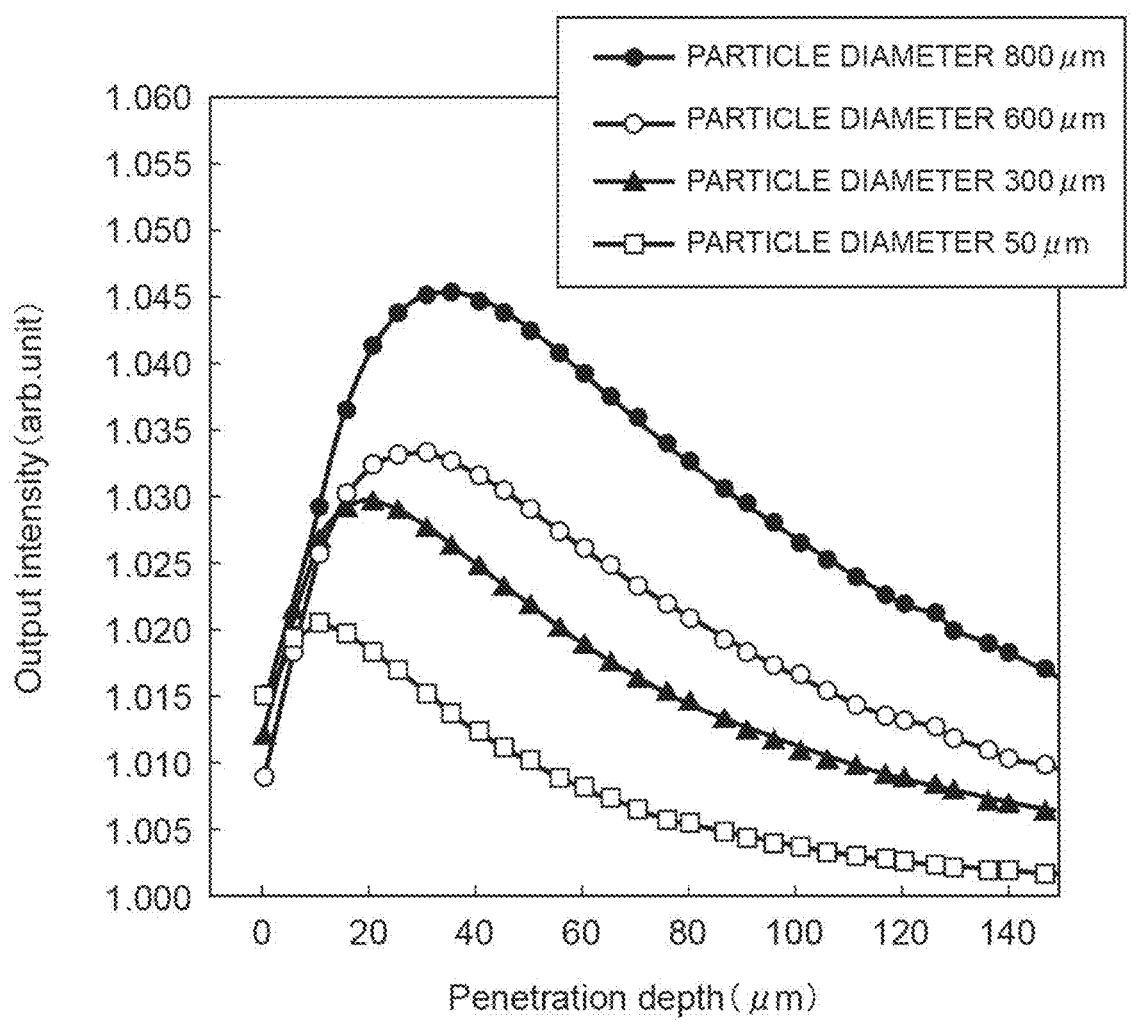
FIG. 12 is a diagram showing a relationship between the eddy current ratio and the penetration depth of the eddy current for each particle diameter of the shot media.

As shown in FIG. 12, the analysis unit 34 may analyze the relationship between the eddy current ratio and the penetration depth of the eddy current for each particle diameter of the shot media. In FIG. 12, the vertical axis represents the eddy current ratio, and the horizontal axis represents the penetration depth. The penetration depth is obtained by converting the excitation frequency. The larger the particle diameter is, the deeper the processing depth is. Therefore, as the particle diameter increases, the penetration depth of the eddy current increases, and the eddy current ratio also increases.

Figure 13:
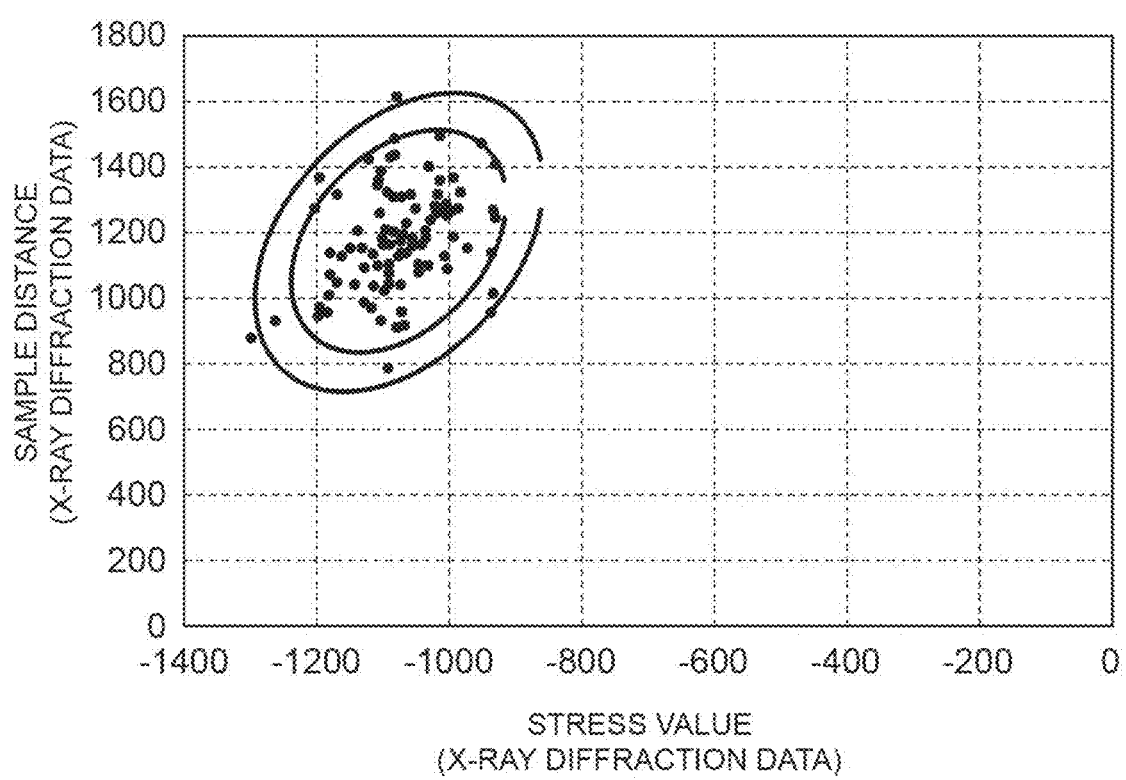
FIG. 13 is a diagram showing the relationship between a stress value and a sample distance.

As shown in FIG. 13, the analyzer 34 may analyze the relationship between the stress value and the sample distance. In FIG. 13, the vertical axis represents the sample distance, and the horizontal axis represents the residual stress value. The sample distance is a distance from the stress measurement device 23 and 24 to the workpiece W The analysis unit 34 may analyze the relationship between the stress value and the MISS SET (Ms). The MS is an index indicating the optimum value of the sample distance. The larger the value of MS is, the farther the stress measurement device 23 and 24 is from the workpiece W and the smaller the value of MS is, the closer the stress measurement device 23 and 24 is to the workpiece W. The closer the value of MS is to 0, the closer the sample distance is to the optimum value (optimum distance). In a case where the stress value deviates from a predetermined threshold value (normal range) in a state where MS is changing around 0 (for example, from −500 to +500), it is presumed that the shot peening is not sufficiently performed. In a case where the stress value deviates from the threshold value (normal range) when the sample distance greatly changes, it is presumed that the alignment between the workpiece W and the stress measurement device 23 and 24 is insufficient.

Figure 14:
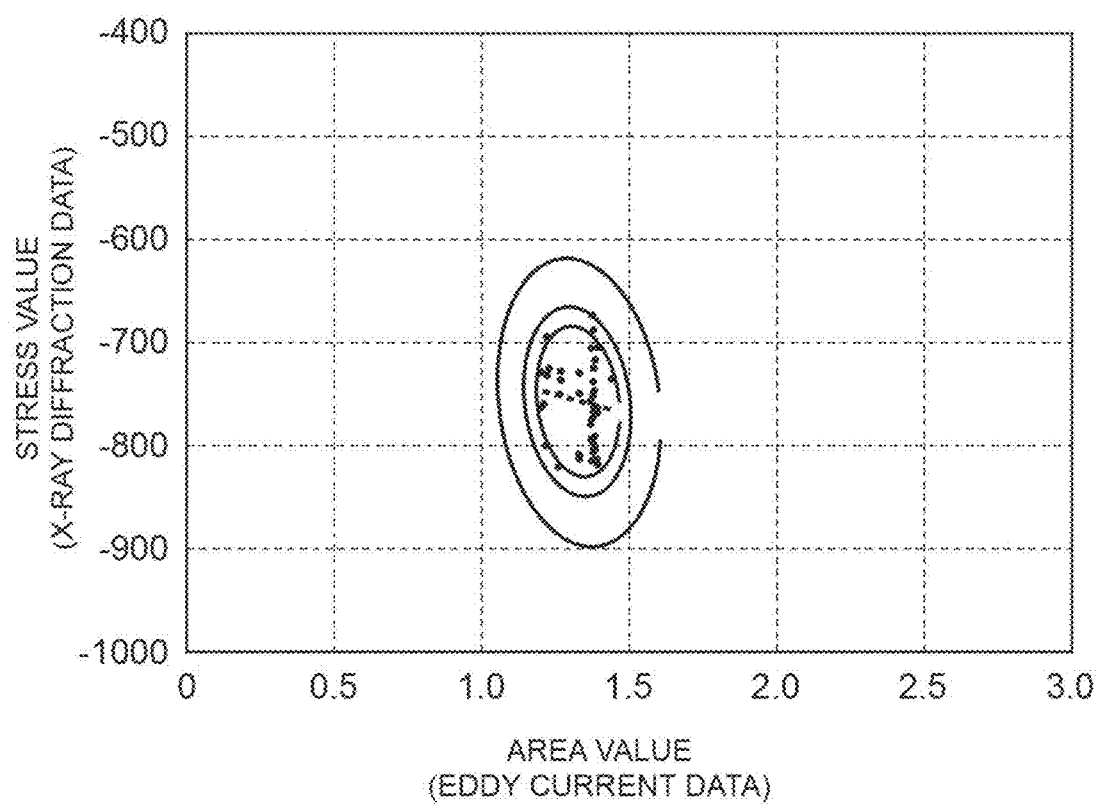
FIG. 14 is a diagram showing a relationship between a stress value and an area value.

As shown in FIG. 14, the analysis unit 34 may analyze the relationship between the residual stress value and the area value. In FIG. 14, the vertical axis represents the residual stress value, and the horizontal axis represents the area value. The area value is a value indicating an area of a region surrounded by a curve drawn based on the measured value (eddy current ratio) output from the magnetic evaluation device 25 and 26 and a straight line indicating the reference ratio in the designated depth range. The designated depth range is a depth range to be evaluated. The reference ratio is a predetermined impedance ratio (eddy current ratio). In a case where the processing device 1 is a shot peening device, if the absolute value of the residual stress value tends to be small and the area value tends to be small, it is presumed that the shot peening is not sufficiently performed.

As the processing parameter, not only a processing parameter that can be directly measured by a sensor or the like but also a processing parameter that can be indirectly measured may be used. An example of such a processing parameter is the particle diameter of the shot media. As shown in FIG. 12, the penetration depth of the eddy current at the peak value of the eddy current ratio decreases as the particle diameter of the shot media decreases. The particle diameter of the shot can be indirectly measured using this relationship.

What is claimed is:

1. A management device for managing a shot peening device that sequentially processes a plurality of workpieces under a processing condition including a plurality of processing parameters, the management device comprising:
   a controller configured to acquire inspection result data indicating an inspection result of each of the plurality of workpieces and processing condition data indicating the processing condition used for shot peening processing each of the plurality of workpieces, the inspection result including electromagnetic characteristics and residual stress before and after shot peening processing, the processing condition data measured by a sensor provided in the shot peening device, wherein
   the controller is further configured to select, as a specific parameter, a processing parameter of which an absolute value of a correlation coefficient between the inspection result and the processing parameter is larger than a correlation threshold value, among the plurality of processing parameters; and
   the controller is further configured to predict whether or not the shot peening device will become abnormal in future based on a temporal change in a value of the specific parameter.

2. The management device according to claim 1, wherein the controller predicts that the shot peening device will become abnormal in future when the value of the specific parameter indicates an increasing tendency or a decreasing tendency.

3. The management device according to claim 2, wherein the shot peening device includes components respectively associated with the plurality of processing parameters, and
   wherein the controller predicts whether or not a component associated with the specific parameter will become abnormal in future.

4. The management device according to claim 3, wherein the controller predicts a time when the inspection result indicates an abnormality based on a temporal change in the inspection result.

5. The management device according to claim 4, wherein the controller determines whether or not a sudden abnormality has occurred in the shot peening device based on the inspection result.

6. The management device according to claim 3, wherein the controller determines whether or not a sudden abnormality has occurred in the shot peening device based on the inspection result.

7. The management device according to claim 2, wherein the controller predicts a time when the inspection result indicates an abnormality based on a temporal change in the inspection result.

8. The management device according to claim 7, wherein the controller determines whether or not a sudden abnormality has occurred in the shot peening device based on the inspection result.

9. The management device according to claim 2, wherein the controller determines whether or not a sudden abnormality has occurred in the shot peening device based on the inspection result.

10. The management device according to claim 1,
wherein the shot peening device includes components respectively associated with the plurality of processing parameters, and
wherein the controller predicts whether or not a component associated with the specific parameter will become abnormal in future.

11. The management device according to claim 10,
wherein the controller predicts a time when the inspection result indicates an abnormality based on a temporal change in the inspection result.

12. The management device according to claim 11,
wherein the controller determines whether or not a sudden abnormality has occurred in the shot peening device based on the inspection result.

13. The management device according to claim 10,
wherein the controller determines whether or not a sudden abnormality has occurred in the shot peening device based on the inspection result.

14. The management device according to claim 1,
wherein the controller predicts a time when the inspection result indicates an abnormality based on a temporal change in the inspection result.

15. The management device according to claim 14,
wherein the controller determines whether or not a sudden abnormality has occurred in the shot peening device based on the inspection result.

16. The management device according to claim 1,
wherein the controller determines whether or not a sudden abnormality has occurred in the shot peening device based on the inspection result.

17. The management device according to claim 16,
wherein the controller sets a normal range based on an inspection result of a workpiece processed normally, and determines that the sudden abnormality has occurred when the inspection result indicated by the inspection result data is out of the normal range.

18. The management device according to claim 1, further comprising an output unit configured to output a prediction result by the controller.

19. A management method of managing a shot peening device that sequentially processes a plurality of workpieces under a processing condition including a plurality of processing parameters, the management method comprising:

a step of acquiring inspection result data indicating an inspection result of each of the plurality of workpieces and processing condition data indicating the processing condition used for shot peening processing each of the plurality of workpieces, the inspection result including electromagnetic characteristics and residual stress before and after shot peening processing, the processing condition data measured by a sensor provided in the shot peening device;

a step of selecting, as a specific parameter, a processing parameter of which an absolute value of a correlation coefficient between the inspection result and the processing parameter is larger than a correlation threshold value, among the plurality of processing parameters; and a step of predicting whether or not the shot peening device will become abnormal in future based on a temporal change in a value of the specific parameter.

20. A non-transitory computer-readable recording medium recording a management program that causes a computer to operate so as to manage a shot peening device that sequentially processes a plurality of workpieces under a processing condition including a plurality of processing parameters, the management program configured to cause a computer to execute:

a step of acquiring inspection result data indicating an inspection result of each of the plurality of workpieces and processing condition data indicating the processing condition used for shot peening processing each of the plurality of workpieces, the inspection result including electromagnetic characteristics and residual stress before and after shot peening processing, the processing condition data measured by a sensor provided in the shot peening device;

a step of selecting, as a specific parameter, a processing parameter of which an absolute value of a correlation coefficient between the inspection result and the processing parameter is larger than a correlation threshold value, among the plurality of processing parameters; and a step of predicting whether or not the shot peening device will become abnormal in future based on a temporal change in a value of the specific parameter.

* * * * *